United States Patent [19]

Lagrange et al.

[11] 4,400,759

[45] Aug. 23, 1983

[54] DIELECTRIC CERAMIC COMPOSITION HAVING A BASE OF BARIUM TITANATE, LITHIUM OXIDE AND CUPRIC FLUORIDE, A CAPACITOR IN WHICH A COMPOSITION OF THIS TYPE IS EMPLOYED, AND A METHOD OF PRODUCTION OF SAID COMPOSITION

[75] Inventors: Alain Lagrange; Alain Beauger, both of Bagnolet, France

[73] Assignee: LCC-CICE-Compagnie Europeenne de Composants Electroniques, Bagnolet, France

[21] Appl. No.: 381,833

[22] Filed: May 25, 1982

[30] Foreign Application Priority Data

May 26, 1981 [FR] France ............................ 81 10457

[51] Int. Cl.³ .............................................. C04B 35/46
[52] U.S. Cl. .................................... 361/321; 501/137; 501/138; 501/151
[58] Field of Search ...................... 501/137, 138, 151; 361/321, 320

[56] References Cited

U.S. PATENT DOCUMENTS

| 2,602,753 | 7/1952 | Woodcock et al. | 501/137 |
| 3,340,074 | 9/1967 | Herczog | 501/138 |
| 3,975,307 | 8/1976 | Matsuo et al. | 501/137 X |
| 4,082,906 | 4/1978 | Amin et al. | 501/137 |
| 4,222,885 | 9/1980 | Hennings et al. | 501/151 X |
| 4,244,830 | 1/1981 | Hennings et al. | 501/138 |

FOREIGN PATENT DOCUMENTS

| 1024366 | 4/1953 | France . | |
| 2439171 | 5/1980 | France . | |
| 283542 | 2/1982 | France . | |
| 574577 | 1/1946 | United Kingdom | 501/138 |

*Primary Examiner*—Helen M. McCarthy
*Attorney, Agent, or Firm*—Oblon, Fisher, Spivak, McClelland & Maier

[57] ABSTRACT

A dielectric ceramic composition which has excellent electrical properties and can be sintered at a temperature within the range of 750° C. to 1000° C. contains 90 to 98% by weight of barium titanate, 0.5 to 2.5% by weight of lithium oxide and 1.5 to 8% by weight of cupric fluoride.

5 Claims, No Drawings

DIELECTRIC CERAMIC COMPOSITION HAVING A BASE OF BARIUM TITANATE, LITHIUM OXIDE AND CUPRIC FLUORIDE, A CAPACITOR IN WHICH A COMPOSITION OF THIS TYPE IS EMPLOYED, AND A METHOD OF PRODUCTION OF SAID COMPOSITION

This invention relates to a dielectric ceramic composition of the ferroelectric type having a base of barium titanate as well as to a capacitor in which a composition of this type is employed. The invention also relates to a method of production of said composition.

Ceramic compositions having a base of barium titanate are well-known, especially in applications relating to the fabrication of capacitors. In fact, they have a very high dielectric constant which makes them wholly suitable for this purpose. By way of example, ceramic compositions which are well-known to those versed in the art and designated as "type II" are disclosed in U.S. Pat. Nos. 2,402,518, 2,433,211 and 3,529,978.

As a general rule, these ceramic compositions are sintered in air or in a reducing atmosphere at temperatures in the vicinity of 1200° to 1400° C. When fabricating capacitors of the multilayer type, for example, the metal electrodes of the capacitors are naturally deposited on the ceramic material prior to sintering. In consequence, this entails the need to employ electrodes of precious metals such as platinum, palladium, gold or their alloys. These electrodes are usually deposited by the silk-screen process.

When employed in the fabrication of capacitors, ceramic compositions of this type are therefore essentially subject to two disadvantages:

it is necessary to make use of precious metals in order to fabricate the electrodes, thus considerably increasing the cost of capacitors of this type;

the high sintering temperature increases the potential danger of interaction between the ceramic material and the electrodes, thereby correlatively increasing the probability of flaws in said electrodes.

Recent attempts have therefore been made to develop dielectric ceramic compositions which permit the use of common metals at much lower cost by reducing the sintering temperature of said compositions.

Type-II dielectric ceramic compositions have now been found which not only have excellent dielectric properties but provide a solution to the problem posed in the foregoing. To this end, the dielectric ceramic compositions according to the invention are distinguished by the fact that they contain 90% to 98% by weight of barium titanate, 0.5 to 2.5% by weight of lithium oxide and 1.5% to 8% by weight of cupric fluoride.

Surprisingly, it has in fact been observed that the novel ceramic compositions described in the foregoing had a sintering temperature which was distinctly lower in comparison with similar compositions of known type while at the same time having wholly excellent electrical properties. In particular, said compositions have excellent electrical properties when making use of barium titanate in which the molar ratio $X = TiO_2/BaO$ is less than 1 and preferably within the range of 0.97 to 0.98. In the last-mentioned case, the electrical properties of these compositions are quite exceptional as will be noted hereinafter.

This stoichiometry in the barium titanate employed is quite contrary to accepted principles arising from past experience in this field when it is desired to reduce the sintering temperature. In fact, those versed in the art are aware of the fact that the sintering temperature of compositions having a barium titanate base usually decreases when the stoichiometry of the barium titanate is increased, that is, when provision is made for an excess number of titanium ions with respect to the number of barium ions with a view to ensuring that the aforementioned molar ratio X is higher than 1. As a general rule, this increase is of the order of 2%.

Conversely, it is well known that a reduction in the number of titanium ions with respect to the number of barium ions in barium titanate is usually conducive to an increase in the sintering temperature. (By sintering temperature is meant the temperature or temperature range which results in maximum densification of the product).

In a preferential embodiment, the dielectric ceramic compositions according to the invention are such that lithium oxide is introduced into the composition in the form of a lithium salt which is capable of liberating the lithium oxide at high temperature. Preferably, said lithium salt will be selected from the lithium nitrates, sulfates or carbonates. In this case, the proportions by weight of the lithium salt will be such that, after decomposition of said salt at high temperature, a quantity of lithium oxide is obtained within the range mentioned in the foregoing.

It should in fact be clearly understood that, if a lithium salt which is capable of liberating lithium oxide $Li_2O$ is introduced in the starting composition, an essential requirement is that only the molar fraction of the salt corresponding to lithium oxide must be counted in the weight of the composition. For example, if there are introduced into the composition 30 g of lithium carbonate $Li_2CO_3$ which will liberate lithium oxide and carbon dioxide gas at high temperature, then the weight to be taken into $$\text{account will be: } 30 \text{ g} \times \frac{\text{molecular weight } Li_2O}{\text{molecular weight } Li_2CO_3},$$

$$\text{namely } 30 \text{ g} \times \frac{29.88}{73.88} = 12.13 \text{ g}.$$

Broadly speaking, the sintering temperature of the compositions according to the invention will be higher than 750° C. and will vary between 750° and 1000° C.

The method of fabrication of capacitors according to the invention accordingly consists in forming a calcined powder containing barium titanate, cupric fluoride and lithium salt in the proportions indicated in the foregoing and then in fabricating the capacitor in a manner known per se, the sintering temperature being either higher than or equal to 750° C.

A better understanding of the invention will be gained from the following examples of application which are given without any implied limitation:

EXAMPLES 1 TO 4

There are introduced in a ball mill 100 grams of a mixture containing barium titanate $BaTiO_3$, cupric fluoride $CuF_2$ and lithium carbonate $Li_2CO_3$. After sintering, the lithium carbonate will liberate lithium oxide $Li_2O$. Table I hereunder gives the percentage by weight of the different elements of the composition, the percentage by weight of lithium carbonate being reduced to its corresponding percentage by weight of lithium oxide $Li_2O$ (as stated in the foregoing).

Grinding of these different constituents is carried out in the presence of 150 cm³ of alcohol by means of 200 grams of alumina balls over a period of 15 hours.

The slurry thus obtained is dried, screened and then mixed with 130 grams of a 3% latex solution in trichloroethane. There is thus obtained a paste which, after sintering, is shaped so as to form disks having a diameter of 8.3 millimeters and a thickness of approximately 0.6 millimeter. Said disks are sintered at a temperature of 930° C. in air for a period of one hour and thirty minutes. Each face of the capacitor is then metallized with a silver paste.

The results obtained are indicated in Table I below in which d designates the density of the ceramic material, R designates the linear shrinkage, C designates the capacitance and the tangent δ designates the dielectric losses measured at 1 KHz and at 1 effective volt, ε designates the dielectric constant of the material, RI designates the insulation resistance of the capacitor as measured at 50 volts and ΔC/C designates the relative variation in capacitance between the value of capacitance at 20° C. and the value of this latter at the different temperatures mentioned (−30° C., +10° C. and +85° C.).

The stoichiometry of the barium titanate employed is such that the ratio $X = TiO_2/BaO$ was equal to 0.97, which means that there is an excess of barium with respect to titanium.

By field effect at 600 volts is meant the relative variation in capacitance $\Delta C/C = (C_0 - C_{600})/C_0$, where $C_0$ is the value of capacitance measured at 1 KHz and at 1 $V_{eff}$ without d.c. bias, where $C_{600}$ is the value of capacitance measured under the same conditions but with a d.c. bias of 600 volts. Taking into account the thickness of the disks (0.6 mm), this represents a bias voltage of 1 V/micron.

It should further be noted that TC designates the Curie temperature of the material above which the material is paraelectric and below which said material is ferroelectric.

TABLE I

| EXAMPLE No | 1 | 2 | 3 | 4 |
|---|---|---|---|---|
| BaTiO₃ (%) | 97.5 | 95.1 | 92.7 | 90.5 |
| Li₂O (%) | 0.55 | 1.1 | 1.7 | 2.1 |
| CuF₂ (%) | 1.95 | 3.8 | 5.6 | 7.4 |
| d (g/m³) | 5.58 | 5.52 | 5.67 | 5.49 |
| R (%) | 15.6 | 16.3 | 17.2 | 17.7 |
| C (pF) | 3194 | 3450 | 2275 | 2278 |
| tg δ × 10⁺⁴ | 80 | 73 | 18 | 50 |
| ε (20° C.) | 5048 | 5384 | 4704 | 4238 |
| RI (GΩ) | 400 | 400 | 100 | 170 |
| ΔC/C  −30° C. | −5% | +3% | +59% | +47% |
| ΔC/C  +10° C. | +5% | +5% | +24% | +21% |
| ΔC/C  +85° C. | −47% | −53% | −51% | −51% |
| Field effects (%) (600 V), namely 1 V/μ | −16.5 | −24.2 | −13.0 | −14.6 |
| ε at TC | 5900 | 5400 | 7000 | 6000 |
| TC (° C.) | 0 | −10 | −30 | −20 |

This table clearly shows the variations of the properties of dielectric compositions according to the invention in the case of a given stoichiometry of barium titanate as a function of the proportion of cupric fluoride and lithium oxide employed. It is observed that the value of the dielectric constant is particularly high in conjunction with very low dielectric losses, a high insulation resistance as well as a limited effect of superimposed electric field. The most satisfactory compromise is achieved by means of these different values in Example 3.

EXAMPLES 5 TO 9

The following examples clearly show the influence of stoichiometry of the barium titanate employed in respect of a given concentration of cupric fluoride equal to 3.8% by weight and of lithium oxide introduced in the form of lithium carbonate and equal to 1.1% by weight.

The preparation of disks and capacitors of these examples of construction is wholly identical with the preparation defined in the preceding examples 1 to 4.

The results thus obtained are mentioned in Table II given below:

TABLE II

| EXAMPLE No | 5 | 6 | 7 | 8 | 9 |
|---|---|---|---|---|---|
| TiO₂/BaO | 0.94 | 0.97 | 0.98 | 0.99 | 1.03 |
| d (g/cm³) | 5.44 | 5.52 | 5.63 | 5.56 | 4.72 |
| R (%) | 17.5 | 16.3 | 16.4 | 16.0 | 10.8 |
| C (pF) | 1312 | 3450 | 3212 | 1203 | 2342 |
| tg δ × 10⁺⁴ | 92 | 73 | 155 | 178 | 910 |
| ε (20° C.) | 2105 | 5384 | 4957 | 1696 | 2628 |
| RI (GΩ) | 200 | 400 | 1400 | 250 | 5 |
| ΔC/C  −30° | +26% | +3% | −30% | −19% | −40% |
| ΔC/C  +10° | +8% | +5% | −8% | −6% | −16% |
| ΔC/C  +85° | −34% | −53% | −43% | −16% | +5% |
| Field effects (%) (600 V), namely 1 V/μ | −14.0 | −24.2 | −29.8 | −17.3 | −37.3 |
| ε at TC | 2600 | 5400 | 6300 | 1750 | 3200 |
| TC (° C.) | −40 | −10 | 0 | +40 | +70 |

It is apparent from this table that the best results are obtained in the case of a value X of the stoichiometric ratio of TiO₂/BaO within the range of 0.97 to 0.98.

What is claimed is:

1. A ceramic consisting essentially of a dielectric composition having 90% to 98% by weight of barium titanate and the balance being, 0.5% to 2.5% by weight of lithium oxide and 1.5% to 8% by weight of cupric fluoride wherein molar ratio of TiO₂/BaO in said barium titanate is higher than or equal to 0.97 and lower than or equal to 0.98.

2. The dielectric composition according to claim 1, wherein the lithium oxide is obtained from a lithium salt which is capable of liberating said oxide at high temperature.

3. The dielectric composition according to claim 2, wherein the lithium salt is selected from lithium nitrates, sulfates or carbonates.

4. An electric capacitor comprising at least one dielectric layer covered by a conductive metal plate, wherein the dielectric layer is constituted by a composition according to claim 1.

5. A method of fabrication of an electric capacitor, wherein said method consists essentially of producing a calcined powder containing 90% to 98% by weight of barium titanate, 1.5% to 8% by weight of cupric fluoride, and 0.5% to 2.5% by weight of lithium oxide said lithium oxide being introduced in the form of a salt and the ratio of TiO₂/BaO in said barium titanate is higher than or equal to 0.97 and lower than or equal to 0.98, and then fabricating the capacitor by means of said calcined powder in a manner known per se, said capacitor being provided with a dielectric ceramic layer which has been sintered at a temperature higher than or equal to 750° C. at which the lithium salt is decomposed and gives rise in particular to the formation of lithium oxide.

* * * * *